United States Patent
Wagner et al.

(10) Patent No.: US 10,563,044 B2
(45) Date of Patent: *Feb. 18, 2020

(54) FIRE-RETARDANT POLYESTERS

(71) Applicant: BASF SE, Ludwigshafen (DE)

(72) Inventors: Sebastian Wagner, Ludwigshafen (DE); Alexander König, Bruchsal (DE); Roland Helmut Krämer, Mannheim (DE); Michael Roth, Lautertal (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/909,757

(22) PCT Filed: Aug. 5, 2014

(86) PCT No.: PCT/EP2014/066783
§ 371 (c)(1),
(2) Date: Feb. 3, 2016

(87) PCT Pub. No.: WO2015/022233
PCT Pub. Date: Feb. 19, 2015

(65) Prior Publication Data
US 2016/0160007 A1  Jun. 9, 2016

(30) Foreign Application Priority Data

Aug. 15, 2013 (EP) .................... 13180577

(51) Int. Cl.
| | | |
|---|---|---|
| *C08K 5/52* | (2006.01) | |
| *C08K 5/00* | (2006.01) | |
| *C08K 5/098* | (2006.01) | |
| *C08K 3/32* | (2006.01) | |
| *C08K 5/3492* | (2006.01) | |

(52) U.S. Cl.
CPC ............. *C08K 5/5205* (2013.01); *C08K 3/32* (2013.01); *C08K 5/0066* (2013.01); *C08K 5/098* (2013.01); *C08K 5/34924* (2013.01)

(58) Field of Classification Search
None
See application file for complete search history.

(56) References Cited

U.S. PATENT DOCUMENTS

| | | |
|---|---|---|
| 3,354,191 A | 11/1967 | Stivers |
| 6,503,969 B1 | 1/2003 | Klatt et al. |
| 2005/0004277 A1 | 1/2005 | Hoerold et al. |

FOREIGN PATENT DOCUMENTS

| | | |
|---|---|---|
| DE | 19820398 A1 | 11/1999 |
| EP | 1 084 181 A1 | 3/2001 |

OTHER PUBLICATIONS

Sci-Finder Information Sheet for AI tetrabromophthalate, CAS 13810-83-8, p. 1.*
International Search Report in International Patent Application No. PCT/EP2014/066783, dated Nov. 18, 2014.
"Fireproof thermoplastic resin compsn.—contg. metal salt(s) of halogenated aromatic carboxylic acids," Derwent, Aug. 9, 1974 (Aug. 9, 1974), XP002059487.

* cited by examiner

*Primary Examiner* — Robert T Butcher
(74) *Attorney, Agent, or Firm* — Marshall, Gerstein & Borun LLP

(57) ABSTRACT

The invention relates to thermoplastic molding compositions comprising
A) from 10 to 97% by weight of a thermoplastic polyester
B) from 1 to 20% by weight of a phosphinic salt
C) from 1 to 20% by weight of a nitrogen-containing flame retardant
D) from 0.5 to 30% by weight of a dicarboxylic salt of the formula

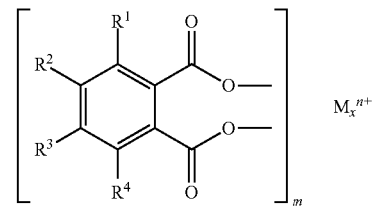

where $R^1$ to $R^4$ are mutually independently halogen or hydrogen, with the proviso that at least one moiety $R^1$ to $R^4$ is halogen,
x=from 1 to 3
m=from 1 to 9
n=from 2 to 3
M=alkaline earth metal, Ni, Ce, Fe, In, Ga, Al, Pb, Y, Zn, Hg
E) from 0 to 50% by weight of other additives,
where the total of the percentages by weight of components A) to E) gives 100%.

12 Claims, No Drawings ly known to the person skilled in the art. Preferred compositions comprise, as component A, PBT.

FIRE-RETARDANT POLYESTERS

CROSS-REFERENCE TO RELATED APPLICATIONS

This is the U.S. national phase of International Application No. PCT/EP2014/066783, filed Aug. 5, 2014, which claims the benefit of European Patent application No. 13180577.2, filed Aug. 15, 2013.

The invention relates to thermoplastic molding compositions comprising
A) from 10 to 97% by weight of a thermoplastic polyester
B) from 1 to 20% by weight of a phosphinic salt
C) from 1 to 20% by weight of a nitrogen-containing flame retardant
D) from 0.5 to 30% by weight of a dicarboxylic salt of the formula $$\left[ \begin{array}{c} R^1 \quad O \\ R^2 \quad \diagup \diagdown \quad \diagdown \\ \quad \vert \quad \vert \quad \quad O- \\ \quad \diagdown \diagup \quad \diagup \\ R^3 \quad \vert \quad \vert \quad \quad O- \\ \quad R^4 \quad O \end{array} \right]_m M_x^{n+}$$

where $R^1$ to $R^4$ are mutually independently halogen or hydrogen, with the proviso that at least one moiety $R^1$ to $R^4$ is halogen,
x=from 1 to 3
m=from 1 to 9
n=from 2 to 3
M=alkaline earth metal, Ni, Ce, Fe, In, Ga, Al, Pb, Y, Zn, Hg
E) from 0 to 50% by weight of other additives,
where the total of the percentages by weight of components A) to E) gives 100%.

The invention further relates to the use of the thermoplastic molding compositions for the production of flame-retardant moldings of any type and to the moldings thus obtainable.

Thermoplastic polyesters are materials with a long usage history. Properties that are attaining increasing importance, alongside the mechanical, thermal, electrical, and chemical properties of these materials, are those such as flame retardancy and high glow-wire resistance. Examples of applications here are those in the household-products sector (e.g. plugs) and in the electronics sector (e.g. protective covers for circuit breakers).

The market is moreover increasingly interested in thermoplastic polyesters rendered flame-retardant without use of halogen. The essential requirements placed upon the flame retardant here are a pale intrinsic color, adequate thermal stability during polymer processing, and also effective flame retardancy in reinforced and unreinforced polymer.

The effectiveness of halogen-free flame retardant additive mixtures, composed of phosphinates and of nitrogen-containing synergists, or reaction products of melamine with phosphoric acid (melamine polyphosphate) is in essence described via UL 94-V fire tests, see EPA 142 3260, EP-A 1084181.

U.S. Pat. No. 3,354,191 discloses halogenated phthalic salts which are used in HIPS (high impact polystyrene). However, with these halogenated systems it is possible to achieve adequate flame retardancy only with an antimony-containing synergist, and the amounts used are very high. This has a disadvantageous effect on mechanical and electrical properties.

It was therefore an object of the present invention, starting from the prior art described above, to provide antimony-free flame-retardant polyester molding compositions with high flame retardancy and with high tracking resistance.

Accordingly, the molding compositions defined in the introduction have been found. Preferred embodiments can be found in the dependent claims.

The molding compositions of the invention comprise, as component (A), from 10 to 93% by weight, preferably from 35 to 97% by weight, and in particular from 35 to 80% by weight, of at least one thermoplastic polyester.

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature.

Their main chain contains an aromatic ring which derives from the aromatic dicarboxylic acid. There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220, preferably from 80 to 160 (measured in 0.5% strength by weight solution in a phenol/o-dichlorobenzene mixture in a ratio by weight of 1:1 at 25° C.) in accordance with ISO 1628).

Particular preference is given to polyesters whose carboxy end group content is up to 100 mval/kg of polyester, preferably up to 50 mval/kg of polyester and in particular up to 40 mval/kg of polyester. Polyesters of this type may be produced, for example, by the process of DE-A 44 01 055. The carboxy end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET), optionally mixed with polyalkylene terephthalates, such as PBT.

Recyclates are generally:
1) that known as post-industrial recyclate: these materials are production wastes arising during polycondensation or during processing, e.g. sprues from injection molding, start-up material from injection molding or extrusion, or edge trims from extruded sheets or films.
2) post-consumer recyclate: these materials are plastics items which are collected and treated after use by the end consumer. Blow-molded PET bottles for mineral water, soft drinks and juices are easily the predominant items in terms of quantity.

Both types of recyclate may be used either in the form of regrind or in the form of pelletized materials. In the latter case, the crude recyclates are separated and purified and then melted and pelletized using an extruder. This usually facilitates handling and free flow, and metering for further steps in processing.

The recyclates used may either be pelletized or in the form of regrind. The edge length should not be more than 10 mm, preferably less than 8 mm.

Because polyesters undergo hydrolytic cleavage during processing (due to traces of moisture) it is advisable to predry the recyclate. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

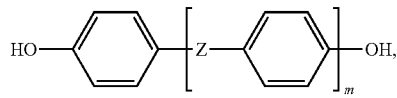

where Z is an alkylene or cycloalkylene group having up to 8 carbon atoms, an arylene group having up to 12 carbon atoms, a carbonyl group, a sulfonyl group, an oxygen atom, or a sulfur atom, or a chemical bond, and where m is from 0 to 2. The phenylene groups of the compounds may also have substitution by $C_1$-$C_6$-alkyl or alkoxy groups, and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxwhenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, polyesters also include halogen-free polycarbonates. Examples of suitable halogen-free polycarbonates are those based on diphenols of the general formula

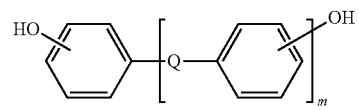

where Q is a single bond, a $C_1$-$C_6$-alkylene group, a $C_2$-$C_3$-alkylidene group, a $C_3$-$C_6$-cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating 0.05 to 2.0 mol %, based on the total of the diphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to average molar masses $M_w$ (weight-average) of from 10 000 to 200 000 g/mol, preferably from 20 000 to 80 000 g/mol.

The diphenols of the general formula are known per se or can be produced by known processes.

The polycarbonates may, for example, be produced by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol as in DE-A 28 42 005, or mono-alkylphenols, or dialkylphenols with a total of from 8 to 20 carbon atoms in the alkyl substituents as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators and optionally of halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

The molding compositions of the invention comprise, as component B), from 1 to 20% by weight, preferably from 1 to 15% by weight, and in particular from 5 to 10% by weight, based on A) to E), of a phosphinic salt.

A suitable component B) is phosphinic salts of the formula (I) or/and diphosphinic salts of the formula (II), or polymers of these

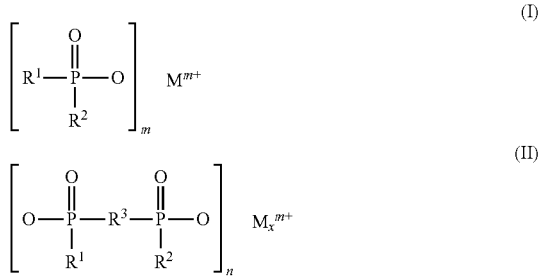

in which
R$^1$ and R$^2$ are identical or different and are hydrogen, C$_1$-C$_6$-alkyl, linear or branched, and/or aryl;
R$^3$ is C$_1$-C$_{10}$-alkylene, linear or branched, C$_6$-C$_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is from 1 to 4; n is from 1 to 4; x is from 1 to 4, preferably m=3, x=3.

It is preferable that R$^1$ and R$^2$ of component B are identical or different and are hydrogen, methyl, ethyl, n-propyl, isopropyl, n-butyl, tert-butyl, n-pentyl and/or phenyl.

It is preferable that R$^3$ of component B is methylene, ethylene, n-propylene, isopropylene, n-butylene, tert-butylene, n-pentylene, n-octylene, or n-dodecylene, phenylene, or naphthylene; methylphenylene, ethylphenylene, tert-butylphenylene, methylnaphthylene, ethylnaphthylene, or tert-butylnaphthylene; phenylmethylene, phenylethylene, phenylpropylene or phenylbutylene.

It is particularly preferable that R$^1$ and R$^2$ are hydrogen, methyl or ethyl, and that M=Al, particular preference being given to Al hypophosphite.

The phosphinates are preferably produced via precipitation of the corresponding metal salts from aqueous solutions. However, it is also possible to precipitate the phosphinates in the presence of a suitable inorganic metal oxide or metal sulfide as carrier material (white pigments, examples being TiO$_2$, SnO$_2$, ZnO, ZnS, SiO$_2$). This method gives surface-modified pigments which can be used as laser-markable flame retardants for thermoplastic polyesters.

The molding compositions of the invention comprise, as component C), from 1 to 20% by weight, preferably from 1 to 15% by weight, and in particular from 5 to 15% by weight, of a nitrogen-containing flame retardant, preferably a melamine compound.

Melamine cyanurate is preferably suitable in the invention (component C) and is a reaction product of preferably equimolar amounts of melamine (formula I) and cyanuric acid or isocyanuric acid (formulae Ia and Ib)

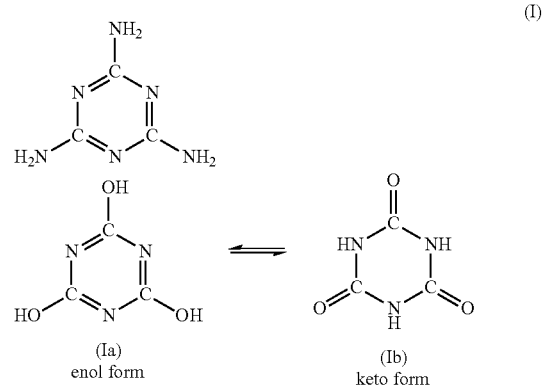

It is obtained by way of example via reaction of aqueous solutions of the starting compounds at from 90 to 100° C. The commercially available product is a white powder of average d$_{50}$ grain size from 1.5 to 7 μm having a d$_{99}$ value smaller than 50 μm.

Other suitable compounds (often also termed salts or adducts) are melamine sulfate, melamine, melamine borate, melamine oxalate, melamine phosphate prim., melamine phosphate sec. and melamine pyrophosphate sec., melamine neopentyl glycol borate, and also polymeric melamine phosphate (CAS No 56386-64-2 or 218768-84-4).

Preference is given to melamine polyphosphate salts derived from a 1,3,5-triazine compound of which the number n representing the average degree of condensation is from 20 to 200, and the 1,3,5-triazine content per mole of phosphorus atom is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that the n value of these salts is generally from 40 to 150, and that the molar ratio of a 1,3,5-triazine compound to phosphorus atom is from 1.2 to 1.8. The pH of a 10% by weight aqueous slurry of salts produced as in EP-B1095030 is moreover generally more than 4.5 and preferably at least 5.0. The pH is usually determined by placing 25 g of the salt and 225 g of pure water at 25° C. in a 300 ml beaker, stirring the resultant aqueous slurry for 30 minutes, and then measuring the pH. The abovementioned n value, the number-average degree of condensation, can be determined by means of $^{31}$P solid-state NMR. J. R. van Wazer, C. F. Callis, J. Shoolery and R. Jones, J. Am. Chem. Soc., 78, 5715, 1956 disclose that the number of adjacent phosphate groups is given by a unique chemical shift which permits clear distinction between orthophosphates, pyrophosphates, and polyphosphates. EP1095030B1 moreover describes a process for producing the desired polyphosphate salt of a 1,3,5-triazine compound which has an n value of from 20 to 200, where the 1,3,5-triazine content of said 1,3,5-triazine compound is from 1.1 to 2.0 mol of a 1,3,5-triazine compound. Said process comprises conversion of a 1,3,5-triazine compound into its orthophosphate salt by orthophosphoric acid, followed by dehydration and heat treatment in order to convert the orthophosphate salt into a polyphosphate of the 1,3,5-triazine compound. Said heat treatment is preferably carried out at a temperature of at least 300° C., and preferably at at least 310° C. In addition to orthophosphates of 1,3,5-triazine compounds, it is equally possible to use other 1,3,5-triazine phosphates, inclusive of, for example, a mixture of orthophosphates and of pyrophosphates.

Suitable guanidine salts are

|  | CAS No. |
| --- | --- |
| G carbonate | 593-85-1 |
| G cyanurate prim. | 70285-19-7 |
| G phosphate prim. | 5423-22-3 |
| G phosphate sec. | 5423-23-4 |
| G sulfate prim. | 646-34-4 |
| G sulfate sec. | 594-14-9 |
| Guanidine pentaerythritol borate | N.A. |
| Guanidine neopentyl glycol borate | N.A. |
| and also urea phosphate green | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

Compounds for the purposes of the present invention are intended to be not only by way of example benzoguanamine itself and its adducts or salts but also the derivatives substituted on nitrogen and its adducts or salts.

Other suitable compounds are ammonium polyphosphate $(NH_4PO_3)$, where n is about 200 to 1000, preferably from 600 to 800, and tris(hydroxyethyl) isocyanurate (THEIC) of the formula IV

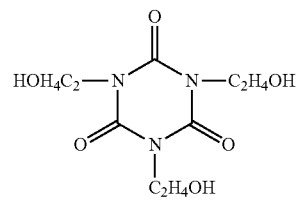

(IV)

or its reaction products with aromatic carboxylic acids $Ar(COOH)_m$, optionally in mixtures with one another, where Ar is a mono-, bi-, or trinuclear aromatic six-membered ring system, and m is 2, 3, or 4.

Examples of suitable carboxylic acids are phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids, and anthracenecarboxylic acids.

They are produced by reacting the tris(hydroxyethyl) isocyanurate with the acids, or with their alkyl esters or their halides in accordance with the processes in EP-A 584 567.

Reaction products of this type are a mixture of monomeric and oligomeric esters which may also have crosslinking. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC, is preferably 90-50:10-50% by weight, in particular 80-50:50-20% by weight, based on the mixture of components B1) of this type.

Other suitable compounds are benzoguanamine compounds of the formula V

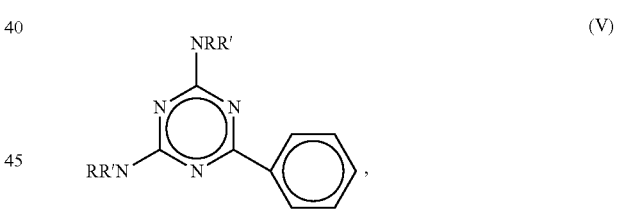

(V)

where R and R' are straight-chain or branched alkyl radicals having from 1 to 10 carbon atoms, preferably hydrogen and in particular their adducts with phosphoric acid, boric acid and/or pyrophosphoric acid.

Preference is also given to allantoin compounds of the formula VI

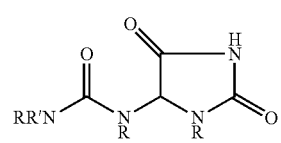

(VI)

where R and R' are as defined in formula V, and also to the salts of these with phosphoric acid, boric acid and/or pyrophosphoric acid, and also to glycolurils of the formula VII and to its salts with the abovementioned acids

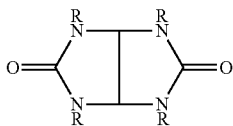

where R is as defined in formula V.

Suitable products are obtainable commercially or in accordance with DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

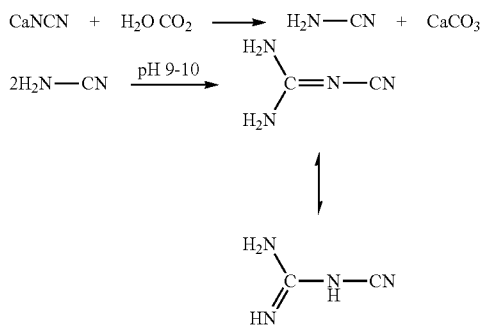

The product obtainable commercially is a white powder with a melting point of from 209° C. to 211° C.

It is preferable that the ratio of component B) to component C) is from 1:1 to 5:1, in particular from 1:1.5 to 1:2.5.

It is very particularly preferable in the invention to use melamine cyanurate having the following particle size distribution:

$d_{98}$<25 µm, preferably <20 µm $d_{50}$<4.5 µm, preferably <3 µm.

The person skilled in the art generally understands a $d_{50}$ value to be the particle size value which is smaller than that of 50% of the particles and larger than that of 50% of the particles.

The particle size distribution is usually determined via laser scattering (by analogy with ISO 13320).

The molding compositions of the invention comprise, as component D), from 0.5 to 30% by weight, preferably from 1 to 25% by weight, and in particular from 5 to 25% by weight, of a dicarboxylic salt of the formula

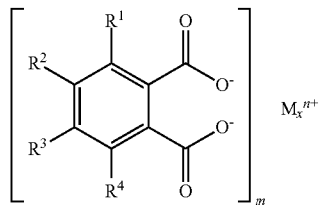

where $R^1$ to $R^4$ are mutually independently halogen or hydrogen, with the proviso that at least one moiety $R^1$ to $R^4$ is halogen, x=from 1 to 3, preferably 1 or 2 m=from 1 to 9, preferably from 1 to 3, 6, or 9, in particular from 1 to 3 n=from 2 to 3

M=alkaline earth metal, Ni, Ce, Fe, In, Ga, Al, Pb, Y, Zn, Hg.

Preferred dicarboxylic salts D) comprise, as moieties $R^1$ to $R^4$, mutually independently, Cl or bromine or hydrogen, and with particular preference all of the moieties $R^1$ to $R^4$ are Cl or/and Br.

Preferred metals M are Be, Mg, Ca, Sr, Ba, Al, Zn, Fe.

Dicarboxylic salts of this type are available commercially or can be produced in accordance with the processes described in U.S. Pat. No. 3,354,191.

The molding compositions of the invention can comprise, as component E), from 0 to 50% by weight, in particular up to 45% by weight, of other additives and processing aids.

Examples of conventional additives E) are amounts of up to 40% by weight, preferably up to 15% by weight, of elastomeric polymers (often also termed impact modifiers, elastomers, or rubbers).

Very generally, these are copolymers which are preferably composed of at least two of the following monomers: ethylene, propylene, butadiene, isobutene, isoprene, chloroprene, vinyl acetate, styrene, acrylonitrile, and acylic or methacrylic esters having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of these elastomers are described below.

Preferred types of elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV below:

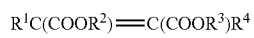  (I)

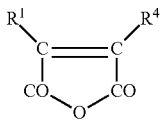  (II)

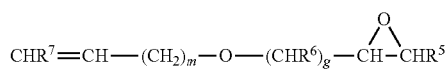  (III)

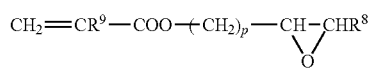  (IV)

where $R^1$ to $R^9$ are hydrogen or alkyl groups having from 1 to 6 carbon atoms, and m is a whole number from 0 to 20, g is a whole number from 0 to 10, and p is a whole number from 0 to 5.

It is preferable that the moities $R^1$ to $R^9$ are hydrogen, where m is 0 or 1 and g is 1. The corresponding compounds are maleic acid, fumaric acid, maleic anhydride, allyl glycidyl ether, and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid, and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Comonomers which may also be used alongside these are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by Blackley in the monograph "Emulsion polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at the surface. Examples of groups of this type are epoxy, carboxy, latent carboxy, amino and amide groups, and also functional groups which may be introduced by concomitant use of monomers of the general formula

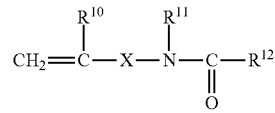

where the substituents may be defined as follows:
$R^{10}$ is hydrogen or $C_1$-$C_4$-alkyl group,
$R^{11}$ is hydrogen or $C_1$-$C_6$-alkyl group or aryl group, in particular phenyl,
$R^{12}$ is hydrogen, $C_1$-$C_{10}$-alkyl group, $C_6$-$C_{12}$-aryl group or —$OR^{13}$
$R^{13}$ is a $C_1$-$C_8$-alkyl group or $C_6$-$C_{12}$-aryl group, if desired with substitution by O- or N-comprising groups,
X is a chemical bond, a $C_1$-$C_{10}$-alkylene group or $C_6$-$C_{12}$-arylene group, or

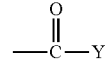

Y is O—Z or NH—Z, and
Z is a $C_1$-$C_{10}$-alkylene group or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3- butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

These graft polymers, in particular ABS polymers and/or ASA polymers, are preferably used in amounts of up to 40% by weight for the impact-modification of PBT optionally in a mixture with up to 40% by weight of polyethylene terephthalate. Blend products of this type are obtainable with the trademark Ultradur®S (previously Ultrablend®S from BASF AG).

Instead of graft polymers whose structure has more than one shell, it is also possible to use homogeneous, i.e. single-shell, elastomers composed of 1,3-butadiene, isoprene and n-butyl acrylate or from copolymers of these.

These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers E) that may be mentioned are glass fibers, glass beads, amorphous silica, asbestos, calcium silicate, calcium metasilicate, magnesium carbonate, kaolin, chalk, mica, barium sulfate, feldspar and powdered quartz. Amounts used of fibrous fillers E) are up to 50% by weight, in particular up to 35% by weight, and amounts used of particulate fillers are up to 30% by weight, in particular up to 10% by weight.

Preferred fibrous fillers that may be mentioned are aramid fibers and potassium titanate fibers, and particular preference is given here to glass fibers in the form of E glass. These can be used in the form of rovings or chopped glass in the forms commercially available.

Amounts used of highly laser-absorbent fillers, such as carbon fibers, carbon black, graphite, graphene, or carbon nanotubes, are preferably below 1% by weight, particularly preferably below 0.05% by weight.

In order to improve compatibility with the thermoplastic, the fibrous fillers can have been surface-pretreated with a silane compound. Suitable silane compounds are those of the general formula

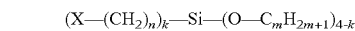

in which the definitions of the substituents are as follows:
X

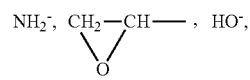

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane. and also the corresponding silanes which comprise a glycidyl group as substituent X.

The amounts generally used of the silane compounds for surface coating are from 0.05 to 5% by weight, preferably from 0.1 to 1.5% by weight, and in particular from 0.2 to 0.5% by weight (based on E).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if desired, have been pretreated with the abovementioned silane compounds, but the pretreatment is not essential.

As component E), the thermoplastic molding compositions of the invention may comprise the usual processing aids, such as stabilizers, oxidation retarders, agents to counteract decomposition due to heat and decomposition due to ultraviolet light, lubricants and mold-release agents, colorants, such as dyes and pigments, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants that can be added are inorganic and organic pigments, and also dyes, for example nigrosin and anthraquinones. EP 1722984 B1, EP 1353986 B1, or DE 10054859 A1 by way of example mention particularly suitable colorants.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be mono- or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given to glycerol and pentaerythritol.

The aliphatic amines can be mono- to tribasic. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides, or esters with amides in combination, in any desired mixing ratio.

The amounts usually used of other lubricants and mold-release agents are up to 1% by weight. Preference is given to long-chain fatty acids (e.g. stearic acid or behenic acid), salts of these (e.g. Ca stearate or Zn stearate), or montan waxes (mixtures of straight-chain, saturated carboxylic acids having chain lengths of from 28 to 32 carbon atoms), Ca montanate or Na montanate, and also low-molecular-weight polyethylene waxes and low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene having from 55 to 76% by weight fluorine content, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-comprising ethylene polymers have homogeneous distribution in the molding compositions and preferably have a particle size $d_{50}$ (numeric average) in the range from 0.05 to 10 µm, in particular from 0.1 to 5 µm. These small particle sizes can particularly preferably be achieved by the use of aqueous dispersions of fluorine-comprising ethylene polymers and the incorporation of these into a polyester melt.

The inventive thermoplastic molding compositions may be prepared by methods known per se, by mixing the starting components in conventional mixing apparatus, such as screw extruders, Brabender mixers or Banbury mixers, and then extruding them. The extrudate may then be cooled and comminuted. It is also possible to premix individual components (an example being application, in a drum or otherwise, of individual components to the pellets), and then to add the remaining starting materials individually and/or likewise in a mixture. The mixing temperatures are generally from 230 to 290° C. In another preferred possibility, component B) is added by the hot-feed or directly into the intake of the extruder.

In another preferred mode of operation, components B) and optionally C) can be mixed with a polyester prepolymer, compounded, and pelletized. The resultant pellets are then solid-phase-condensed under inert gas continuously or batchwise at a temperature below the melting point of component A) until the desired viscosity has been reached.

The molding compositions of the invention feature good electrical and flame-retardancy properties.

The moldings produced from the molding compositions of the invention are used for the production of internal and external parts, preferably with load-bearing or mechanical function in any of the following sectors: electrical, furniture, sports, mechanical engineering, sanitary and hygiene, medical, power engineering and drive technology, automobile and other means of transport, or housing material for equipment and apparatuses for telecommunications, consumer electronics, household devices, mechanical engineering, the heating sector, or fastening parts for installation work, or for containers and ventilation parts of any type.

These materials are suitable for the production of fibers, foils, and moldings of any type, in particular for applications as plugs, switches, housing parts, housing covers, headlamp bezels, shower heads, fittings, smoothing irons, rotary switches, stove controls, fryer lids, door handles, (rear) mirror housings, (tailgate) screen wipers, sheathing for optical conductors.

Devices which can be produced with the polyesters of the invention in the electrical and electronics sector are: plugs, plug parts, plug connectors, cable harness components, circuit mounts, circuit mount components, three-dimensionally injection-molded circuit mounts, electrical connector elements, mechatronic components, and optoelectronic components.

Possible uses in automobile interiors are for dashboards, steering-column switches, seat parts, headrests, center consoles, gearbox components, and door modules, and possible uses in automobile exteriors are for door handles, headlamp components, exterior mirror components, windshield wiper components, windshield wiper protective housings, decorative grilles, roof rails, sunroof frames, and exterior bodywork parts.

Possible uses of the polyesters in the kitchen and household sector are: production of components for kitchen equipment, e.g. fryers, smoothing irons, buttons, and also garden and leisure sector applications, such as components for irrigation systems or garden equipment.

EXAMPLES

Component A:
Polybutylene terephthalate with intrisic viscosity IV 130 ml/g and having 34 meq/kg terminal carboxy group content (Ultradur® B 4500 from BASF SE) (IV measured in 0.5% by weight solution of phenol/o-dichlorobenzene), 1:1 mixture at 25° C. in accordance with DIN 53728/ISO).
Component B:
Al hypophosphite
Component C/1:
Melamine cyanurate with an average particle size of ~2.6 μm (the material used being Melapur® MC 25 from BASF SE)
Component C/2:
Melamine polyphosphate (Melapur® 200 from BASF SE)
Component D/1:
Aluminum tetrabromophthalate (CAS: 13654-74-5) [$Al_2(TBrPA)_3$] or 2/3 $Al.C_8 H_2 Br_4O_4$
Component D/2
Zinc salts of tetrabromophthalic acid ("TBrPA") (CAS: 13654-76-7)
[$ZnC_8H_2Br_4O_4$]
Component D/3
Iron salt of TBrPA (CAS: 13810-83-8)
2/3 $Fe.C_8Br_4O_4H_2$ or [$Fe_2(TBrPA)_3$]
Component D/4
Calcium salt of TBrPA (CAS: 13899-13-3)
($CaC_8H_2Br_4O_4$)
Component E/1:
Standard chopped glass fiber for polyester with average thickness 10 μm
Production of molding compositions/test specimens Corresponding plastics molding compositions were prepared by compounding. For this, the individual components were mixed in an extruder with a flat temperature profile at from 250-270° C., discharged in the form of strand, cooled until pelletizable, and pelletized. The test specimens were injected-molded at a melt temperature of about 260° C. and a mold temperature of about 80° C. in an Arburg 420C injection-molding machine.

LOI was determined in accordance with ISO 4589-2, and fire class in accordance with UL 94 (1.6 mm), and CTI was measured in accordance with IEC 60112: specimen thickness being 3 mm, original surface without any special conditioning. The test was carried out at 400 V. Char yield (TGA) was measured in a TGA Q5000 instrument from TA. The weight tested was in each case from 4.5 to 5 mg. The test was carried out at 10° C./min under nitrogen. The flush rate was 65 ml/min. The amount of residue (char yield) was determined at 600° C.

The tables show the constitutions of the molding compositions and the test results.

TABLE 1

| Constitution [% by wt.] | comp 1 | comp 2 | comp 3 | comp 4 | comp 5 | comp 6 | comp 7 | comp 8 | comp 9 | comp 10 |
|---|---|---|---|---|---|---|---|---|---|---|
| A | 76 | 66 | 66 | 56 | 66 | 56 | 66 | 56 | 66 | 56 |
| B | — | 6.3 | — | — | — | — | — | — | — | — |
| C/1 | — | 3.7 | — | — | — | — | — | — | — | — |
| D/1 | — | — | 10 | 20 | — | — | — | — | — | — |
| D/2 | — | — | — | — | 10 | 20 | — | — | — | — |
| D/3 | — | — | — | — | — | — | 10 | 20 | — | — |
| D/4 | — | — | — | — | — | — | — | — | 10 | 20 |
| E | 24 | 24 | 24 | 24 | 24 | 24 | 24 | 24 | 24 | 24 |
| TGA (($N_2$) TGA) [%] | n.d. | n.d. | n.d. | 29.9 | n.d. | 32.2 | n.d. | 32.85 | n.d. | 30.15 |
| Total afterflame time [s] | >250 | >250 | >250 | 40 | >250 | 47 | >250 | 30 | >250 | 30 |
| Flaming drops | + | + | + | + | + | − | + | + | + | + |
| UL class | n.d. | n.d. | n.d. | V-0 | n.d. | V-0 | n.d. | V-2 | n.d. | V-2 |
| CTI 400 V | n.d. | n.d. | n.d. | failed | n.d. | failed | n.d. | failed | n.d. | failed |
| LOI [%] | 19 | n.d. | n.d. | 26 | n.d. | <25 | n.d. | 26.3 | n.d. | 25.5 | n.d. = not determined

TABLE 2

| Constitution [% by wt.] | 1 | comp 2 | comp 3 | 4 | comp 5 | comp 6 | 7 | comp 8 | comp 9 | 10 | comp 11 | comp 12 |
|---|---|---|---|---|---|---|---|---|---|---|---|---|
| A | 56 | 51 | 51 | 56 | 51 | 51 | 56 | 51 | 51 | 56 | 51 | 51 |
| E | 24 | 24 | 24 | 24 | 24 | 24 | 24 | 24 | 24 | 24 | 24 | 24 |
| D/1 | 10 | 15 | 15 | — | — | — | — | — | — | — | — | — |
| D/2 | — | — | — | 10 | 15 | 15 | — | — | — | — | — | — |
| D/3 | — | — | — | — | — | — | 10 | 15 | 15 | — | — | — |
| D/4 | — | — | — | — | — | — | — | — | — | 10 | 15 | 15 |
| C/1 | — | 10 | — | — | 10 | — | — | 10 | — | — | 10 | — |

TABLE 2-continued

| Constitution [% by wt.] | 1 | comp 2 | comp 3 | 4 | comp 5 | comp 6 | 7 | comp 8 | comp 9 | 10 | comp 11 | comp 12 |
|---|---|---|---|---|---|---|---|---|---|---|---|---|
| C/2 | 3.7 | — | 10 | 3.7 | — | 10 | 3.7 | — | 10 | 3.7 | — | 10 |
| B | 6.3 | — | — | 6.3 | — | — | 6.3 | — | — | 6.3 | — | — |
| Char yield (TGA (N$_2$)) [%] | 39.32 | 31.89 | 30.80 | 37.24 | 31.02 | 28.50 | 38.09 | 30.65 | 31.64 | 38.25 | 31.09 | 29.73 |
| Total afterflame time | 10 s | 45 s | 65 s | 27 s | 75 s | 47 s | 15 s | 17 s | 45 s | 12 s | 12 s | 120 s |
| Flaming drops | no | no | no | no | no | no | no | no | yes | no | no | no |
| UL 94 | V-0 | V-0 | V-1 | V-0 | V-1 | V-1 | V-0 | V-0 | V-2 | V-0 | V-0 | V-2 |
| CTI @ 400 V | passed | failed | failed | passed | failed | failed | not measured | failed | failed | not measured | not measured | not measured |
| LOI [%] | 27 | 26.5 | 26.2 | 26.5 | <25 | 25.5 | 27 | 26.8 | 25.8 | 26.8 | 25.5 | 26.3 |

The invention claimed is:

1. A thermoplastic molding composition consisting of:
  A) from 10 to 97% by weight of a thermoplastic polyalkylene terephthalate;
  B) from 1 to 20% by weight of a phosphinic salt;
  C) from 1 to 20% by weight of a nitrogen-containing flame retardant, the nitrogen-containing flame retardant comprising melamine cyanurate;
  D) from 0.5 to 30% by weight of a dicarboxylic salt of the formula

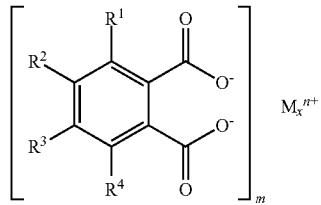

where $R^1$ to $R^4$ are mutually independently halogen or hydrogen, with the proviso that at least one moiety $R^1$ to $R^4$ is halogen,
  x=from 1 to 3,
  m=from 1 to 9,
  n=from 2 to 3, and
  M is selected from the group consisting of an alkaline earth metal, Ni, Ce, Fe, In, Ga, Al, Pb, Y, Zn, and Hg; and
  E) from 0 to 50% by weight of other additives selected from the group consisting of elastomeric polymers, fibrous fillers, particulate fillers, heat stabilizers, ultraviolet light stabilizers, oxidation retarders, lubricants, mold-release agents, colorants, plasticizers, fluorine-containing ethylene polymers, and combinations thereof;
  wherein:
    the total of the percentages by weight of components A) to E) gives 100%, and
    the thermoplastic molding composition is free from antimony.

2. The thermoplastic molding composition according to claim 1, in which the moieties $R^1$ to $R^4$ of component D) are mutually independently selected from the group consisting of Cl, Br, and hydrogen.

3. The thermoplastic molding composition according to claim 1, in which the metals M of component D) are selected from the group consisting of Be, Mg, Ca, Sr, Ba, Al, Zn, and Fe.

4. The thermoplastic molding composition according to claim 3, in which component B) comprises phosphinic salts of the formula (I) or/and diphosphinic salts of the formula (II), or polymers of these

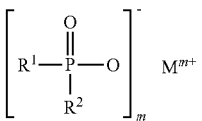 (I)

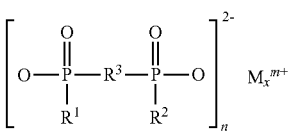 (II)

in which
  $R^1$ and $R^2$ are identical or different and are selected from the group consisting of hydrogen, linear or branched $C_1$-$C_6$-alkyl, and aryl;
  $R^3$ is selected from the group consisting of linear or branched $C_1$-$C_{10}$-alkylene, $C_6$-$C_{10}$-arylene, $C_6$-$C_{10}$-alkylarylene, and $C_6$-$C_{10}$-arylalkylene;
  M is selected from the group consisting of Mg, Ca, Al, Sb, Sn, Ge, Ti, Zn, Fe, Zr, Ce, Bi, Sr, Mn, Li, Na, K, and a protonated nitrogen base;
  m is from 1 to 4; n is from 1 to 4; x is from 1 to 4.

5. The thermoplastic molding composition according to claim 4, in which $R^1$ and $R^2$ of component B) are mutually independently selected from the group consisting of hydrogen, methyl, and ethyl.

6. The thermoplastic molding composition according to claim 1, in which component B) is selected from the group consisting of Al hypophosphite, Ca hypophosphite, and mixtures thereof.

7. An article selected from the group consisting of fiber, foil, and molding obtained from a polyester molding composition according to claim 1.

8. A method of producing an article selected from the group consisting of fibers, foils, and molding, the method comprising the use of a polyester molding according to claim 1.

9. The thermoplastic molding composition according to claim 1, wherein:
  component A) is present in the composition in an amount from 35 to 80% by weight;
  component B) is present in the composition in an amount from 5 to 10% by weight;
  component C) is present in the composition in an amount from 1 to 15% by weight;
  component D) is present in the composition in an amount from 5 to 25% by weight; and
  component E) is present in the composition in an amount from 0 to 45% by weight.

10. The thermoplastic molding composition according to claim 9, wherein:
- component B) is selected from the group consisting of Al hypophosphite, Ca hypophosphite, and mixtures thereof;
- the moieties $R^1$ to $R^4$ of component D) are mutually independently selected from the group consisting of Cl, Br, and hydrogen; and
- the metals M of component D) are selected from the group consisting of Be, Mg, Ca, Sr, Ba, Al, Zn, and Fe.

11. The thermoplastic molding composition according to claim 10, wherein:
- the moieties $R^1$ to $R^4$ of component D) are mutually independently selected from the group consisting of Cl and Br; and
- the metals M of component D) are selected from the group consisting of Ca, Al, Zn, and Fe.

12. The thermoplastic molding composition according to claim 1, wherein:
- component A) is present in the composition in an amount from 35 to 80% by weight;
- component B) is present in the composition in an amount from 5 to 10% by weight;
- component C) is present in the composition in an amount from 1 to 15% by weight;
- component D) is present in the composition in an amount from 5 to 25% by weight;
- component E) is present in the composition in an amount from 0 to 45% by weight;
- the polyalkylene terephthalate if component A) is derived from alkanediols having 2 to 6 carbon atoms;
- component B) is selected from the group consisting of Al hypophosphite, Ca hypophosphite, and mixtures thereof;
- the moieties $R^1$ to $R^4$ of component D) are Br; and
- the metals M of component D) are selected from the group consisting of Ca, Al, Zn, and Fe.

\* \* \* \* \*